Nov. 20, 1945.  H. C. BEHRENS  2,389,341
SPEED CONTROL MECHANISM FOR CUT-OFFS
Filed Nov. 20, 1943  4 Sheets-Sheet 2
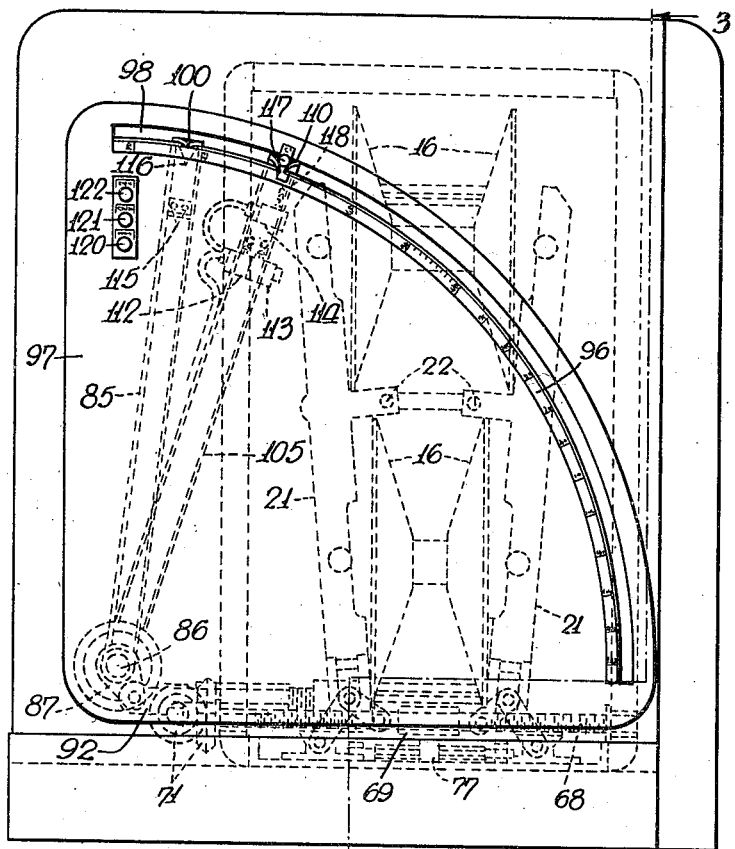
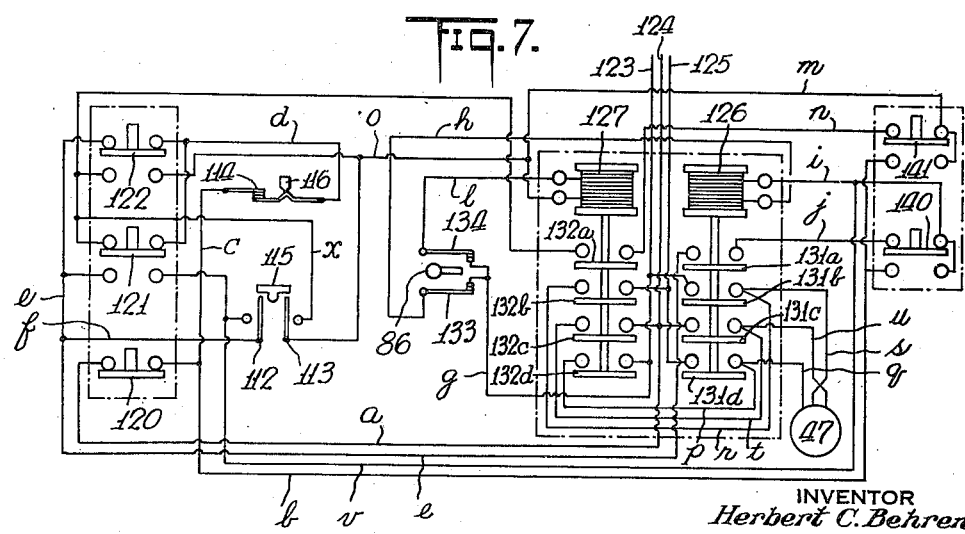
INVENTOR
Herbert C. Behrens
BY
ATTORNEYS

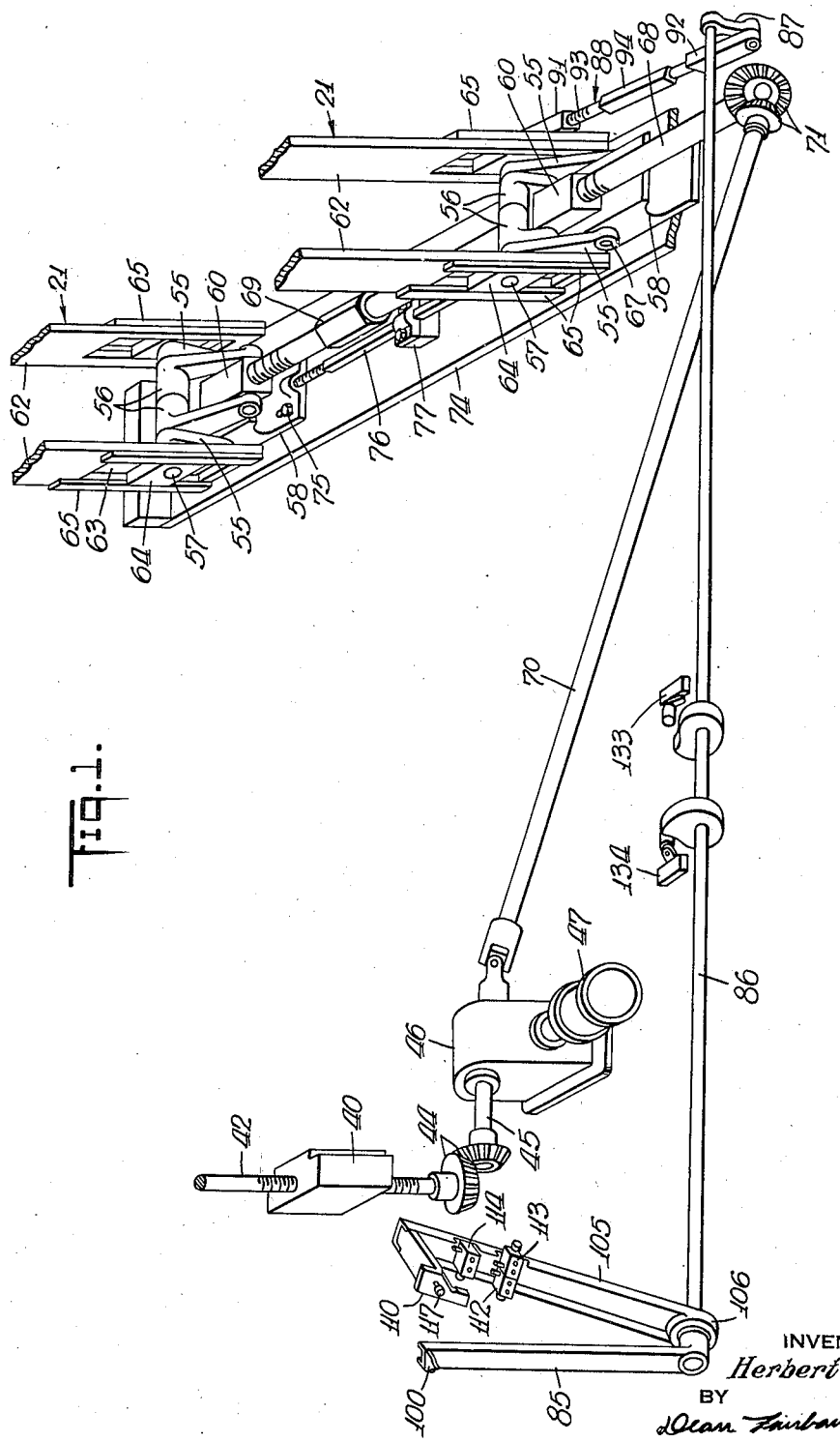

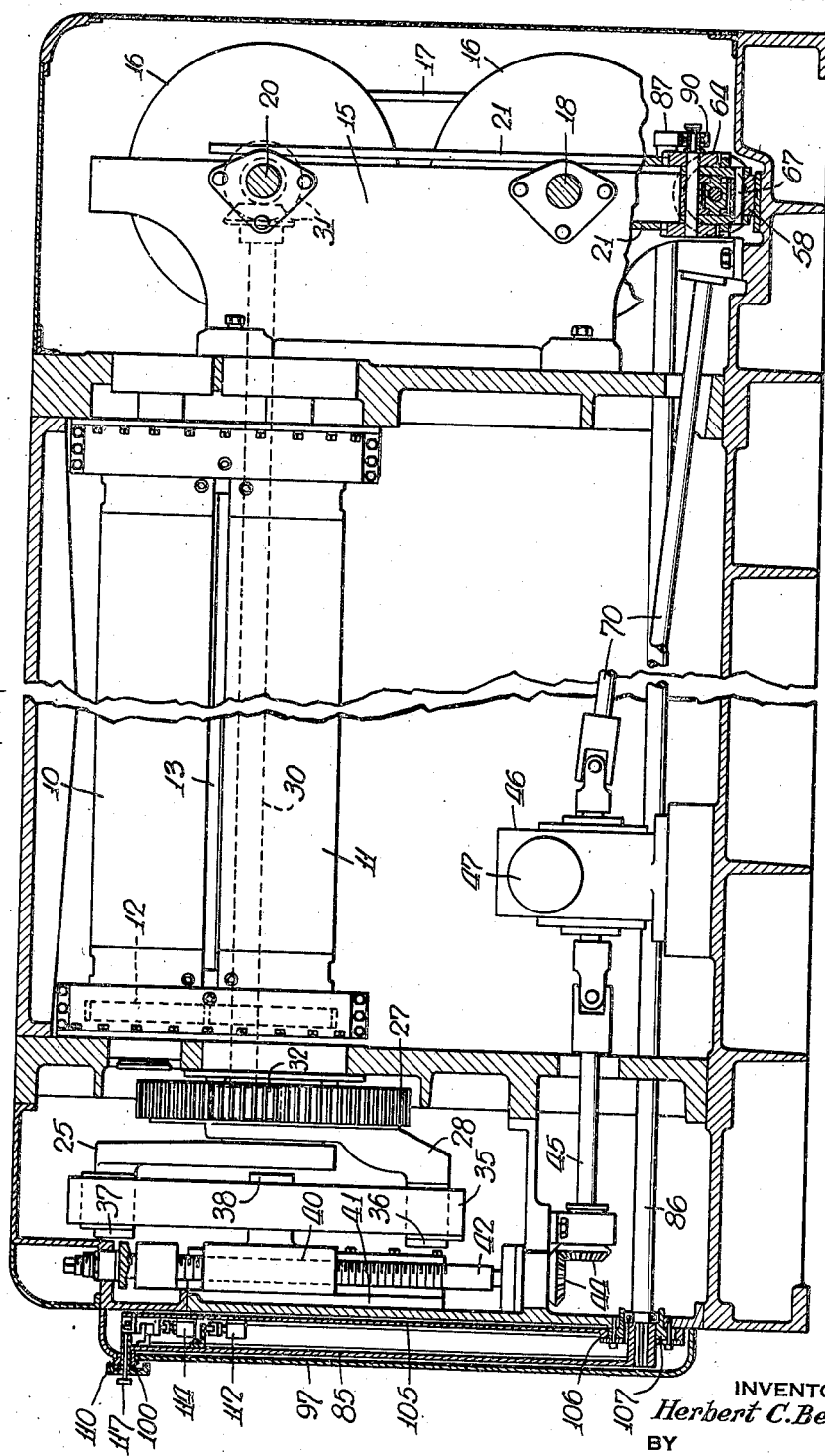

Nov. 20, 1945.  H. C. BEHRENS  2,389,341
SPEED CONTROL MECHANISM FOR CUT-OFFS
Filed Nov. 20, 1943  4 Sheets-Sheet 4
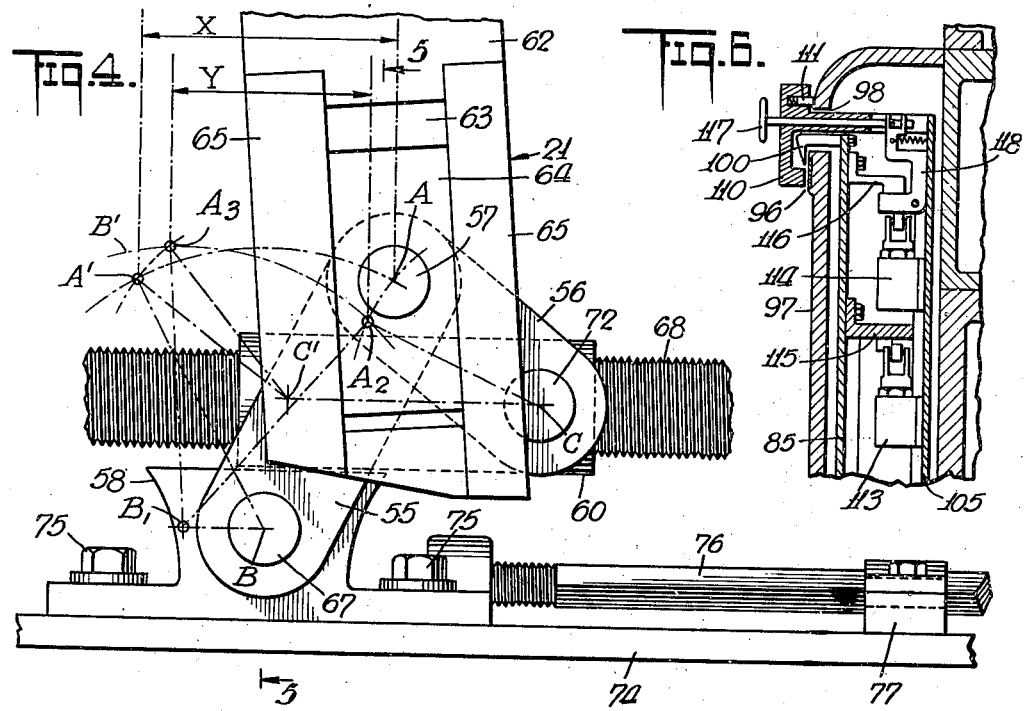
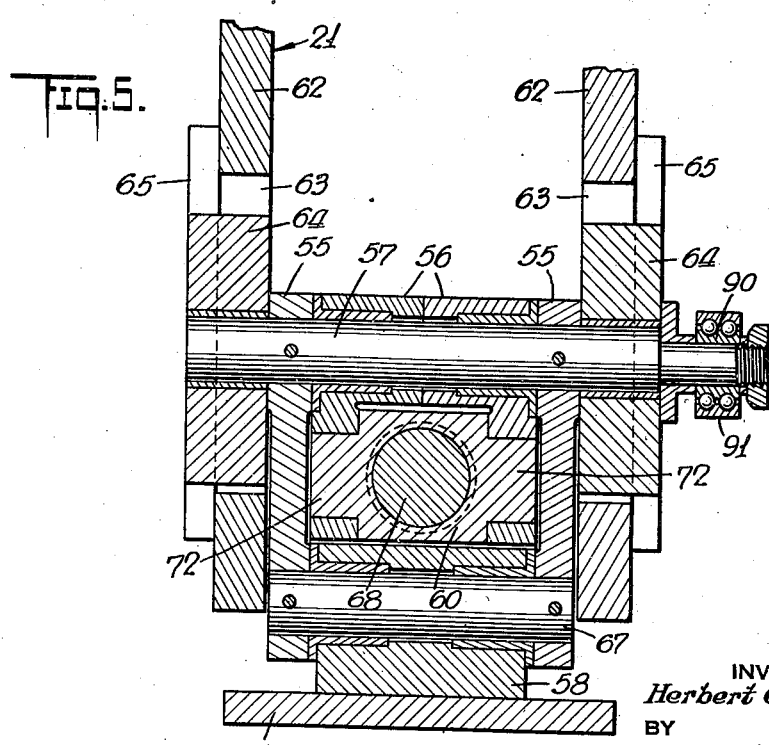
INVENTOR
Herbert C. Behrens
BY
ATTORNEYS Patented Nov. 20, 1945

2,389,341

UNITED STATES PATENT OFFICE 2,389,341

SPEED CONTROL MECHANISM FOR CUTOFFS

Herbert C. Behrens, Haddon Heights, N. J., assignor to Samuel M. Langston Co., Camden, N. J., a corporation of New Jersey Application November 20, 1943, Serial No. 511,039

23 Claims. (Cl. 164—68)

The present invention may be used in various types of machines, for instance in machines for cutting continuously delivered sheet material, such as double-faced corrugated board, into sections, and relates more particularly to an adjusting means for selectively varying the operation of a portion of the machine, such for instance as that employed for cutting such a sheet into sections, the length of which may be varied within wide limits.

In a machine of this general type, there is usually provided a cutter having knives traveling with the sheet during the cutting operation, a speed change transmission for changing the total time cycle of the cutter to cut shorter or longer sections, and a speed varying mechanism for accelerating and decelerating the speed of said cutter during the cutting portion of its cycle of operation so as to keep the speed of said cutter at the instant of cutting the same as that of the material operated on.

The speed change transmission is of the type in which infinite changes in velocity ratio can be obtained within a definite range, and usually includes two pulleys and a power transmitting belt passing over said pulleys. One or both of the pulleys have end sections adjustable towards or away from each other by an adjusting lever, to change the relative effective diameters of the pulleys, and thereby change the speed ratio of the drive. For convenience, this general type of speed change transmission will hereinafter be referred to as a Reeves mechanism or drive, although other mechanisms of the same general type, such as a P. I. V., may be employed.

The mechanism for varying the speed of the cutter in its time cycle may be of the general type shown in my prior Patent 2,262,913, dated November 18, 1941, although other types may be employed.

Where the mechanism for adjusting the speed of the cutter in its cycle is connected to the mechanism for adjusting the speed input to output ratio of the Reeves drive, and the two are simultaneously actuated from a single operating member, some form of compensating mechanism is required for the Reeves adjusting mechanism so as to give a gradually varying degree of adjustment for equal increments of movement of the operating member. One form of such compensating mechanism is shown and claimed in my prior Patent 2,320,710, dated June 1, 1943.

The Reeves adjusting mechanism heretofore proposed will conform adjustments in the Reeves drive to those in the cutter for a fixed belt length on the Reeves drive, but in practice, the Reeves belt may vary considerably in length in different original installations, and it usually stretches after being in service. Such changes or variations in belt length alter the speed curve characteristics of the Reeves drive. As the belt stretches, the effective adjusting movement of the Reeves adjusting levers becomes more restricted. If, for example, a Reeves belt is selected which will originally allow a range of sheet length of 34" to 190" to be cut, stretching of said belt and the resulting smaller permissible adjusting movement of the Reeves levers may reduce this range to sheet lengths of, for example, 40" to 150".

One object of the present invention is to provide a new and improved Reeves adjusting mechanism which can be adjusted to compensate for changes or variations in the length of the Reeves belt, whereby a desired relationship can be maintained between the adjustment in the Reeves drive and that in the cut-off.

Another object is to provide a new and improved Reeves adjusting mechanism whereby accurate relationship can be maintained between the adjustment in the Reeves drive and that in the cut-off, even after the necessary adjustments required when the Reeves belt has stretched and the sheet length range has been reduced.

Another object is to provide a new and improved Reeves mechanism whereby, when adjustments are made to compensate for changes or variations in the length of the Reeves belt, and the sheet range has been reduced, simultaneous adjustment of the Reeves mechanism and the cut-off mechanism may be made even though there may be a sacrifice of some accuracy in curve conformity.

Another object is to provide a new improved form of sheet length indicating and preselecting mechanism by which the length of the sheet cut in any adjusted position of the Reeves will be directly and accurately shown and various adjustments automatically made in accordance with a preselection of said sheet length.

Various other objects of the invention will be apparent from the following particular description, and from an inspection of the accompanying drawings, in which Fig. 1 is a perspective view showing somewhat diagrammatically a portion of a machine embodying the present invention;

Fig. 2 is a side elevation of a portion of the machine, and showing the sheet length indicator;

Fig. 3 is a vertical section through the machine, a portion of the section being taken approximately along line 3—3 of Fig. 2;

Fig. 4 is a side elevation of a portion of the Reeves adjusting mechanism;

Fig. 5 is a section taken on line 5—5 of Fig. 4;

Fig. 6 is an enlarged section siimlar to a portion of Fig. 3 and showing a portion of the sheet length indicating and preselecting mechanism; and Fig. 7 is a wiring diagram for operating the sheet length indicating and preselecting mechanism, and for controlling the operation of the Reeves and cut-off adjusting motor.

The cutting mechanism shown in the drawings is of the traveling cut-off type, in which a pair of coacting knives come together at the instant of cutting and travel with the sheet during cutting action at substantially the same speed as said sheet. The invention is shown applied to a machine having cutting mechanism of the rotary type, although so far as certain aspects of the invention are concerned, this may be of any suitable traveling type, such as that shown in the Langston Patent No. 1,359,076.

In the specific form shown, the cut-off comprises a pair of rotary cutter heads or drums 10 and 11 mounted for rotation about horizontal parallel axes, and connected together at one or both ends by intermeshing gears 12 to rotate said drums in opposite directions and at the same peripheral speed. The cutter heads 10 and 11 are provided with knives 13, which coact to cut into sections the sheet passing between the oppositely rotating cutter heads. A single knife on one might cut against a mandrel on the other instead of having two knives, as referred to in Sieg Patent 2,177,465.

The cutter heads 10 and 11 are driven from the main drive (not shown) through a speed change mechanism 15 of the Reeves type, and which is shown as of the conventional type and comprising two pulleys having parallel axes, each including a pair of opposed axially slidable conical disc 16, and a power transmitting belt 17 passing over said pulleys between these discs. The discs 16 of one pair are slidably keyed to an input driving shaft 18, while the other two discs 16 are slidably keyed to an output shaft 20 having a drive connection to the cutter drums 10 and 11, as will be hereinafter described.

Two levers 21 are provided at opposite ends of the pulleys, and each lever is pivotally connected to the adjacent two discs 16 of the two pulleys. The levers are mounted for angular adjusting movement about fixed point supports 22. Thus the angular movement of the two Reeves levers 21 in opposite directions about their pivot mountings 22 causes the two discs 16 of one pulley to move axially towards each other and the two discs of the other pulley to move away from each other, so that the effective diameters of the pulleys are altered and the speed ratio between the input shaft 18 and the output shaft 20 correspondingly modified. This changes the frequency or total time cycle of the knives 13 in accordance with the desired change in sheet length without modifying the speed of travel of the paper. Each such change in the total time period of the cycle of the knives 13 would change the speed at the time of cutting, and therefore it is necessary that there be provided means whereby the knives are driven at varying speed in their cycle, and the speed is readjusted to correspond to the speed of the sheet material at the instant of cutting.

The speed varying mechanism is arranged between the output side of the Reeves 15 and the cutter heads 10 and 11, and may be of the general type disclosed in my Patent No. 2,262,913. This mechanism comprises a crank arm 25 fixed to the shaft of the lower cutting head 11, and a drive gear 27 rotatable on the hub of said crank arm, and having rigid therewith a crank arm 28, which is rotated at constant speed from the Reeves mechanism, as for instance by a shaft 30, a mitre gear connection 31 between the Reeves output shaft 20 and one end of said shaft 30, and a spur gear 32 fixed to the other end of said shaft 30 and driving the gear 27 through an idler (not shown).

Power is transmitted from the crank arm 28 to the crank arm 25 through a lever 35, journalled on the crank pin 36 of the crank arm 28 and provided with a guide slot extending lengthwise thereof for receiving the crank pin 37 of the crank arm 25 and a pivot support 38 about which the lever 35 swings. In the position shown in Fig. 3, the pivot 38 is in axial alignment with the shaft of the lower drum 11, so that the two crank arms 25 and 28 and the two cutter drums 10 and 11 rotate at the same constant angular velocity.

The pivot 38 is adjustable radially of the axis of the drum 11 to vary the speed of the cutting drums 10 and 11 during each revolution thereof. For that purpose, the pivot 38 is connected to a crosshead 40 mounted to slide in a stationary frame member or guide 41 extending along the diameter of the drum 11. This crosshead 40 is threaded on a screw shaft 42, so that the pivot 38 may be moved vertically and in a radial direction with respect to the shaft of the lower drum 11.

The screw shaft 42 is normally stationary so as to hold the pivot 38 in a predetermined adjusted position. In order to bring this pivot 38 to any degree of eccentricity in respect to the shaft of the lower drum, there is provided a mitre gear connection 44 between the screw shaft 42 and a shaft 45 driven through a speed reduction gear unit 46 from a control motor 47, which is at rest during normal sheet cutting operation of the machine.

The details of the cut-off mechanism so far described form per se no part of the present invention, but are merely those of one form which can be used in connection with the mechanism for adjusting the Reeves drive.

As a part of the present invention, I provide a novel means for adjusting the Reeves drive to vary the drive speed ratio to the proper extent while adjusting the speed varying crosshead 40. In the form illustrated, there is associated with each of the Reeves levers 21, an adjusting device (see Figs. 4 and 5) substantially in the general form of a toggle joint comprising two arm members 55 and 56 pivotally connected end to end with their knee or hinge connection 57 slidably secured to a Reeves lever near its lower end. The outer end of one of the arm members or links 55 is pivotally mounted on a stationary block 58, while the outer end of the other arm member or link 56 is pivotally mounted on a member 60 which may be slidable on the block 58. The pivotal supports for the outer ends of the two arm members or links 55 and 56 are independently adjustable to permit selective variations in the speed curve characteristics of the Reeves drives, as will be more fully described.

Each of the Reeves levers 21 comprises a pair of opposed bars 62 rigidly interconnected as a unit and receiving compactly therebetween the arm members or links 55 and 56 of each Reeves adjusting unit above referred to. Each knee pivot is operatively connected in some suitable manner to its corresponding lever 21 to swing the levers in opposite directions. This connection may include links, or each of these bars 62 may have a guide slot 63 at its lower end, with a slide or crosshead 64 movable therein and forming a journal for the extremity of the pivot 57. Strips 65 may be welded or otherwise secured to each bar 62 on opposite sides of each of its guide slot 63 to afford a greater slide bearing area for the slides 64.

The member 55 comprises two parallel arms with their upper ends journalled on the shaft 57 and their lower ends straddling the pivot block 58, and secured to the extremities of a shaft or pivot pin 67 journalled in said block.

The link 56 also consists of two parallel arms having their upper ends journalled on the shaft 57, and their lower ends pivotally mounted on journals 72 on the adjusting power applying member or nut 60. This member 60 is in the form of a nut threaded on a screw 68 which is driven from the motor 47 through the speed reduction gearing 46, shaft 70, and mitre gears 71 to the shaft of the adjusting screw 68. This screw has a left-hand thread engaging one of the nuts 60 and a right-hand thread engaging the other nut 60, so that as said screw is rotated, the two nuts 60 are moved in opposite directions to cause the corresponding angular movement of the two Reeves levers 21 about their pivoted supports 22 and in opposite directions, to spread apart the discs of one pulley and to push together those of the other pulley. As the pivot knee connection 57 which acts on the levers, moves through an arc about the center of the pivot pin 67, it gives a gradually varying degree of adjustment to said lever for equal increments of rotation of the screw 68. Thus the speed curve characteristics of the Reeves drive is made to conform to that of the cut-off at the instant of cutting.

For adjusting the position of the nuts 60 to the proper spacing for the cut-off adjusting mechanism, the screw 68 has a non-circular section 69 for receiving a suitable turning tool. When the adjusting rotation of the screw 68 is effected by turning the section 69, transmitting of this movement to the shaft 42 may be prevented in any suitable way, as for instance, by disengaging one of the mitre gears 71 from the shaft of said screw.

Each of the pivot blocks 58 is fastened to a base 74 in such a manner as to allow some adjustments of said block along said base. For example, studs 75 threaded in the base 74 may pass through elongated slots in the pivot block 58, so that by loosening these studs, the block may be moved in the direction of the length of the screw 68.

For effecting the adjusting movement of the two blocks 58 in unison, they may be interconnected by an adjusting screw 76 which has a left-hand and right-hand thread in engagement with said blocks respectively, and is journalled in and held against endwise movement by a bearing 77 fixed to the base 74. This screw 76 desirably has a part of polygonal cross-section to receive a suitable turning tool by which the two blocks 58 may be simultaneously adjusted in opposite directions when the studs are loosened. After such adjustment, said studs are tightened to lock the blocks in place.

By the proper adjusting movement of the nuts 60 and the pivot blocks 58, it is possible to obtain selective characteristics in the speed curve of the Reeves drive for any given rotary adjustment of the screw 42 of the cut-off adjuster.

To illustrate the operation of the mechanism, it is assumed that the range of sheet lengths is from 34" to 190", and that to obtain this range, the adjustable pivot 38 of the cut-off is moved through a range of 8". Using a screw 42 of six threads per inch, it requires 48 turns of said screw to move said pivot 38 through its full range. On the Reeves drive 15, a predetermined length of belt has been established which will allow such a range that the total time cycle of the cut will be anywhere from 34" to 190" of a sheet that may pass through between successive cuts. It is assumed that this belt length for this full range indicated will cause each Reeves lever 21 to move angularly the distance corresponding to the movement of the link knee pivot 57 from one extreme position A to the other extreme position A1 indicated in Fig. 4. One limit of movement of the Reeves lever 21 is obtained when the two adjustable pivots 67 and 72 of the Reeves adjusting mechanism are in the full line positions B and C shown in Fig. 4. Assuming that this original movement of the Reeves lever 21 through its full range is effected by a movement of nut 60 of 4" represented by the movement of the pivot 72 on said nut from position C to position C1 on Fig. 4, and that the screw 68 has six threads per inch, it requires 24 turns of said screw to move the Reeves drive 15 through a range to cut sheets from 34" to 190". Screws 42 and 68 being interconnected to the control motor 47 by the two sets of bevel gears 44 and 71, one of these sets, as for example the set 71, has a 2:1 reduction to allow the screw 42 to make 48 turns and screw 68 to make 24 turns.

If, in the course of time, the Reeves belt 17 should stretch 2", and it is found, for example, that the range of the Reeves drive 15 has been reduced so as to cut sheets only within the range of 40" to 160" corresponding to a more restricted movement of the Reeves lever as shown in Fig. 4, the position of the pivots 67 and/or 72 is altered. This restricted movement is because, as is usual with Reeves drives, belt stretching is compensated for by an adjustment of the pivots 22 of levers 21 toward each other. If, under these conditions, where the sheet range has been reduced, a sacrifice of a slight accuracy in curve alignment between the Reeves 15 and the cut-off mechanism is not objectionable, the pivots 67 are moved outwardly away from each other, for example, each to the position B1, by the adjustment of the blocks 58. In this new position of the pivot 67, the initial angular relationship between the two links 55 and 56 will be changed, and the link knee pivot 57 will be changed from extreme position A to extreme position A2. From this position it can swing to point A3 for its opposite extreme position. This change in the angular position of the two links 55 and 56, and in the position of the knee pivot 57 longitudinally with respect to the Reeves lever 21 causes said lever to swing through a smaller angle corresponding to the increased belt length. However, to effect this smaller lever movement, the pivot 72 on the nut 60 still moves the same original distance of 4" from point C to point C1. This allows the adjustable pivot 38 to travel through its complete range of 8", so that the full range of sheet length is maintained with only slight sacrifice in accuracy of cutter speed in relation to sheet speed, at the instant of cutting.

If, after the belt 17 stretches, it is desired to maintain correct relationship between the cut-off mechanism and Reeves drive, the nuts 60 are moved apart along the screw 68 and the blocks 58 are moved apart along the base 74 sufficiently to move the respective pivots 72 and 67 into new relative positions. These new adjusted positions of the pivots 72 and 67 are appropriate to cause the Reeves lever 21 to travel angularly through its new decreased range resulting from the increase in the belt length. However, this angular travel of the Reeves lever 21 through this new restricted range is effected by the travel of the nut 60 a distance shorter than its original full range distance of 4″. The screw 68 will therefore require fewer turns to move the nut 60 through the new restricted range, and since the screw 42 on the cut-off adjusting mechanism is coupled thereto, said screw 42 will make a proportionally smaller number of turns and will cause the adjustable pivot 38 to travel a corresponding smaller distance. The two ranges of movement of the Reeves levers 21 are indicated by the lines X and Y on Fig. 4.

Merely as an example it may be assumed that the Reeves drive pulleys have a possible drive ratio of 6 to 1 of which only the ratio of 5½ to 1 is utilizable with a new belt before any stretching of the belt takes place. Such a belt may ride from the innermost portion or bottom of one pulley to within one inch of the outside edge of the pulley during the full range of adjustment. Thus there is a margin for take-up on the effective diameter of the pulley for stretch of the belt. The movement of the belt between these limits gives a specific speed curve which may be matched by proper adjustment of the mechanism through either blocks 58 or nuts 60 or both. When the belt stretches it may ride to the outer edge of the pulley in one position and within a certain distance from the bottom of the pulley in the other position, and will give approximately the same ratio but a different speed curve from the original belt length, together with a smaller movement of the Reeves adjusting levers 21. By proper adjustment of the blocks 58 or nuts 60 this restricted movement of the Reeves levers can be compensated for while still allowing the complete range of movement of the pivot 38 of the lever 35. This permits the speed curve of the Reeves drive to be adjusted to match the specific set curve of the cut-off mechanism whether the Reeves belt is of standard length or has been stretched to some other length within the maximum length allowed by the diameter of the Reeves pulleys.

The sheet length being cut is shown by an indicator pointer 85 movable along a scale and connected to one of the Reeves levers 21. The speed of the Reeves drives 15 in respect to the speed of the sheet is the prime controlling factor in determining sheet length, since definite positioning of the Reeves levers results in definite speeds of rotation of the cutter. For connecting one of the Reeves levers 21 with the sheet length indicating pointer 85, the latter is keyed to one end of a suitably journalled cross-shaft 86. The other end of this cross-shaft 86 is connected to one of the Reeves levers 21 by a transmission comprising a crank 87 on said shaft 86 and pivotally connected to one end of a link 88. The other end of this link 88 is pivotally secured to an extension of the knee pivot shaft 57 by a bearing 90. This link 88 is of adjustable length so that the position of the sheet length indicating lever 85 may be altered to correspond with a particular speed ratio of the Reeves drive 15. Merely as an example, the link 88 may comprise two aligned bars 91 and 92 pivotally secured to the link knee shaft 57 and crank arm 87 respectively, and interconnected by an adjusting screw 93 having right and left hand thread engagements with these bars to shorten or lengthen the link 88 and thereby rock the shaft 86 and bring the pointer to correct position.

Any movement of the Reeves levers 21 carrying the bar section 91 through the adjusting mechanism 55, 56 and 57 is transmitted to the sheet length indicating lever 85 by the link 88 in such a manner that said lever 85 indicates the length of the sheet being cut when in any adjusted position of said Reeves lever. The effective length of the link 88 should be changed for each adjustment of the position of toggle link pivots 67 and 72 through rotation screws 68 or 76.

As the two Reeves levers 21 are angularly adjusted in accordance with the desired sheet length, the indicating lever 85 is moved over a scale 96 calibrated to indicate sheet length. This scale 96 is shown of quadrant segmental shape and mounted on a cover plate 97 on the operating side of the machine. The sheet length indicating lever 85 is disposed behind the cover plate 97, but has its free end section passing through a segmental slot 98 adjacent to the scale 96 and terminating in a pointer 100 movable along said scale.

Preselecting means are provided for automatically stopping the motor 47 of the Reeves cut-off adjusters when the required adjustments in the time cycle of the cutter for a different sheet length have been made. This preselecting means comprises a manually operable preselector lever 105 having a hub 106 embracing a fixed bearing 107 coaxially with the cross-shaft 86, so that this lever can be angularly moved about the same center as the sheet length indicating lever 85. The preselector lever 105 has its free end section U-shaped to loosely receive therein the U-shaped end portion of the indicating lever 85 when the latter lever is moved into registry with said preselector lever 105. The outer end section of this preselector lever 105 passes through the cover slot 98, and is formed with an exposed end flange 110, which presents a radial selector bevel edge adapted to ride over the scale 96, and which carries a spring-pressed plunger 111 adapted to yieldably bear against the cover plate 97 and thereby hold said lever 105 in selected position.

Preselector lever 105 carries two adjoining but slightly spaced limit switches 112 and 113 in the control circuit of the motor 47. These switches are normally open by spring action and are closed by a trip 115 on the indicating lever 85. They determine the direction of rotation of said motor so that as the indicating lever 85 is moved by said motor, it will become properly centered in registry with said preselector lever 105. A limit switch 114 also on the preselector lever is also in the control circuit of said motor and is normally closed by spring action. This switch renders the holding or motor switch interlock circuit inoperative when it is opened against its spring action by a trip 116 carried by said indicating lever 85. The trip actuates said switch 114 through an intervening spring-pressed piece 118 pivoted on the preselector lever 105.

The limit switch 114 is normally closed, and therefore in order to prevent the switches 112 and 113 from operating the control circuit of the motor 47 when the trip 115 actuates said switches upon the manual setting of the preselector lever 105, a handle 117 slidably carried by the end flange 110 of said preselector is provided so that the operator can open the switch 114 by swinging the pivoted piece 118.

When it is desired to move the preselector lever 105 in either direction to a new position indicating the length of the next batch of sheets to be cut, the handle 117 is pulled out against spring action to thus open the switch 114 and thereby render the control circuit of the motor 47 inoperative. Any actuations of the switches 112 and 113 by the trip 115 on the indicating lever, during such movement of the preselector lever to a new position, thus do not cause energizing of the motor 47.

Mounted on the cover plate 97 are a plurality of switches. These include a "stop" switch 120 serving as an emergency switch to open the control circuit of the motor 47 and thereby stop said motor; a "long" switch 121 for causing rotation of said motor in a direction to increase the length of the sheet to be cut for the next run, and a "short" switch 122 for causing rotation of said motor in a direction to decrease the length of the sheet to be cut for the next run. These switches 120, 121 and 122 may be of the push-button spring type which will cause said switches to return to their normal open positions when the operating finger pressure thereon is released.

The control circuit of the motor 47 is connected between the power lines 123, 124 and 125, and comprises a standard forward magnetic motor starter with a coil 126 and a standard reverse magnetic motor starter with a coil 127. The magnetic coil 126 controls an armature switch having contacts 131a, 131b, 131c and 131d on one side of the operating circuit of the motor 47, and the magnetic coil 127 controls an armature switch having contacts 132a, 132b, 132c and 132d on the other side of the motor operating circuit.

The forward magnetic motor starter also includes a switch 131 operated from the magnetic coil 126 and serving as an interlock for the circuit of said coil. The reverse magnetic motor starter similarly includes a switch 132 operated from the magnetic coil 127 and serving as an interlock for the circuit of said coil.

Limit safety switches 133 and 134 are desirably provided in the control circuit of the motor 47 to prevent the Reeves and cut-off adjusting mechanisms from overrunning their extreme positions. They may be mounted on the base of the machine and operated by rotation of the shaft 86, which may oscillate through about 90° in the form illustrated.

In the operation of the preselecting device described, assuming that the machine is cutting a 39" sheet and the next size sheet to be cut is 50", the operator moves the preselector lever 105 to the position on the scale 96 corresponding to 50". The lever 105 will be retained in this selected position by the spring-pressed plunger 11 bearing against the cover plate 97.

In the normal or running condition of the machine, current from the lead line 124 is connected by wire $a$ to stop switch 120, thence through wire $b$ to open contact of jog switches 140 and 141. The stop switch 120 is connected through wire $c$ to the closed limit switch 114 on the preselector lever; thence by wire $d$ to the normally closed side of the "short" switch 122; thence by wire $e$, which is connected to the open side of the "long" switch 121. A wire $f$ leads from wire $e$ to the normally open switch 112 on the preselector lever. The wire $e$ also leads to the open contact of switch 131a.

Current from the lead line 123 is connected by wire $g$ to the two normally closed limit switches 133 and 134, which are mounted on the base of the machine and are operated by the indicator shaft to break the circuit if the Reeves drive be adjusted to the maximum or minimum sheet length positions. The switch 133 is connected by wire $h$ to the coil 126, wire $i$ through jog "long" switch 140 and wire $j$ to the open side of switch 131a. The switch 134 is connected by wire $l$ to the coil 127 from which wire $m$ leads to closed jog "short" switch 141 from which wire $n$ leads to open switch 132a. From coil 127 also leads wire $o$ to the open "short" switch 122 and to the open switch 113.

The coils 126 and 127 control the flow of current to the motor 47 to effect rotation of the latter in either direction. The power line 123 leads to switches 131b and 132d; the power line 124 leads to switches 131c and 132c and power line 125 leads to switches 131d and 132b. Switches 131d and 132d are connected by wire $p$ to wire $q$ to the motor 47. Switches 131b and 132b are connected by wire $r$ and to the motor by wire $s$. Switches 131c and 132c are connected by wire $t$ and by the wire $u$ to the motor.

When the operator has finished one run and has cut the desired number of sheets of one length and is ready to cut a batch of sheets of a preselected different length, it is necessary to adjust the Reeves drive and the cut-off. He has previously set the preselector lever at the proper position for the next length. The operator then presses either the "short" switch 122 or the "long" switch 121 in accordance with whether the next sheets are to be shorter or longer than the last batch. If the next sheets are to be longer, the "long" switch 121 is depressed. Current may then flow from line 124 through $a$, 120, $c$, 114, $d$, 122, upper position, 121 in lower position, wire $v$, wire $i$, coil 126, wire $h$, 133, back to lead 123.

Energizing of coil 126 closes switches 131a, 131b, 131c and 131d, and current may flow from leads 123, 124 and 125 through wires $u$, $s$, and $q$, and the motor will rotate in one direction until current is interrupted by 114 or 133 due to holding circuit of 131a. If jog switch 140 is depressed, the same effect is produced, except the rotation of the motor is momentary or of such duration as the time in which 140 is held in a depressed position due to the holding circuit 131a being cut out during operation of said switch 140.

The preselector lever contact 115 may move over the switch 112 without effect, but when the contact 116 engages switch 114, it breaks the circuit from 124 through $a$, 120 and $c$ and stops the motor. The motor could have stopped at any time by depressing switch 120. If the motor idles along after the current has been cut off at switch 114 and until the contact 115 reaches the switch 113, this normally open switch will be closed, and as 114 has been closed, current may now flow from 124 through $a$, 120, $c$, 114, $d$, 121, $x$, 113, $o$, 127, $l$, 134 and $g$ to 123. This energizing of coil 127 will close contacts 132a, 132b, 132c and 132d. Lead 123 is thus connected through 132d, $p$, $q$, to motor 47. Lead 124 is connected through 132c, $t$ and $u$ to motor 47, and lead 125 is connected through 132b, $r$ and $s$ to said motor. Thus, the motor will start to rotate in the opposite direction to move the pointer 85 back until the contact 114 is broken and the motor is stopped.

If, upon completion of a run, the next batch is to be shorter, the preselector lever is appropriately set and the "short" switch 122 is depressed. This will cause the energizing of the coil 127 and appropriate direction of rotation of the motor 47 until the circuit is broken at 114. Overrunning to close switch 112 will reverse the motor until switch 114 is again opened.

At any time during adjusting operation, the motor may be stopped by depressing switch 120 and at any time during normal cutting operation, the Reeves and cut-off may be slightly adjusted if the operator at the discharge end of the machine notices that the cut sheets are slightly too long or slightly too short. This is done by momentarily depressing either switch 140 or 141. The jog button station is provided with latches which allows the normally closed circuit of the jog buttons to be opened, so that each of the jog button switches 140 and 141 has two open circuits. When the jog switches 140 and 141 are so latched, the push button switches 121 and 122 on the cut-off may be used as jog button switches.

Having thus described my invention, what I claim as new and desire to secure by Letters Patent is:

1. A speed change drive of the Reeves type having a pair of pulleys connected by a belt, and a lever for changing the effective relative diameters of said pulleys, said drive being provided with an adjusting means for moving said lever, and including a pair of toggle arms, a knee pivot connecting said arms and having sliding engagement with said lever, normally stationary means for pivotally supporting one of said arms, and means for the other arm to thereby swing said knee pivot and said lever.

2. A speed change drive of the Reeves type having a pair of pulleys, a connecting belt, and a lever for changing the effective relative diameters of said pulleys, said drive being provided with adjusting means for moving said lever in opposite directions and including a pair of arms pivotally jointed end to end by a knee having sliding pivot connection with said lever to swing the latter, a block supporting one of said arms for pivotal movement about a stationary axis and adjustable to change the angular relationship of said latter arm with respect to said lever, and means for applying adjusting power to the other arm to move the knee pivot and thereby adjustably move said lever.

3. A speed change drive of the Reeves type having an adjusting lever for changing speed ratio, and means for moving said lever, including a pair of arms angularly jointed pivotally end to end and having a knee pivot slidable along said lever to swing the latter, a stationary pivot anchor for one of the arms, a nut having a pivotal connection with the other arm, and a screw engaging said nut for moving the latter and thereby swinging said lever.

4. A speed change drive of the Reeves type having a pair of pulleys, a pair of oppositely movable adjusting levers for changing the effective relative diameters of said pulleys, and adjusting means for moving said levers in opposite directions, and including two pairs of arms, each pair being angularly jointed pivotally end to end with their knee pivot slidably connected to a respective lever, normally stationary pivoted supports for the other end of one arm of each pair, a pair of blocks pivotally connected to the other ends of the other arms, a screw interconnecting said blocks and having left and right-hand thread engagement with said blocks respectively, and means for rotating said screw to move said blocks in opposite directions and thereby move said knee pivots and swing said levers in unison in opposite directions.

5. A speed change drive of the Reeves type having a pair of pulleys, a pair of oppositely movable adjusting levers for changing the effective relative diameters of said pulleys, and adjusting means for moving said levers in opposite directions, and including two pairs of arms, each pair being angularly jointed pivotally end to end with their knee pivot slidably connected to a respective lever, normally stationary pivotal supports for the other end of one arm of each pair, a pair of blocks pivotally connected to the other ends of the other arms, and means for moving said blocks in opposite directions and thereby move said knee pivots and swing said levers in unison in opposite directions.

6. A speed change drive of the Reeves type having a pair of pulleys, a pair of oppositely movable adjusting levers for changing the effective relative diameters of said pulleys, and adjusting means for moving said levers in opposite directions, and including two pairs of arms, each pair being angularly jointed pivotally end to end with their knee pivot slidably connected to a respective lever, normally stationary pivotal supports for the other end of one arm of each pair, a pair of blocks pivotally connected to the other ends of the other arms, means for moving said blocks in opposite directions and thereby move said knee pivots and swing said levers in unison in opposite directions, and means for adjusting said pivotal supports towards and from each other.

7. A speed change drive of the Reeves type having a pair of pulleys, a pair of oppositely movable adjusting levers for changing the effective relative diameters of said pulleys, and adjusting means for moving said levers in opposite directions and including a pair of members, one for swinging one of said levers and the other for swinging the other lever, and means for moving said members toward and from each other and simultaneously in the direction of the length of said levers for moving said levers at a varying rate with respect to the rate of operation of said means.

8. A speed change drive of the Reeves type having a pair of pulleys, a lever for changing the effective relative diameters of said pulleys, and adjusting means for moving said lever in opposite directions and including a slide engaging said lever for sliding movement lengthwise thereof, a control operating member, and a transmission between said member and said slide for moving said lever at a varying rate with respect to said operating member.

9. A speed change drive of the Reeves type having a pair of pulleys, a lever for changing the effective relative diameters of said pulleys, and adjusting means for moving said lever in opposite directions and including a slide engaging said lever for sliding movement lengthwise thereof, a control operating member, a transmission between said member and said slide for moving said lever at a varying rate with respect to said operating member, and means for adjusting said transmission to change the rate of varying movement of said lever with respect to said operating member.

10. A speed change drive of the Reeves type having a pair of pulleys, an adjusting lever for changing the effective relative diameters of said pulleys, and adjusting means for moving said lever in opposite directions and including a slide engaging said lever for sliding movement lengthwise thereof, a control operating member, and a transmission between said control member and said slide for moving said lever at a varying rate with respect to said operating member and including an arm having a stationary pivot anchor near one end and pivotally connected to said slide near its other end, said pivot anchor being adjustable to change the rate of varying movement of said lever with respect to said operating member.

11. In a cut-off mechanism of the type having a knife for cutting a continuously advancing sheet into sections and which travels with said sheet at the instant of cutting, and a speed change drive of the Reeves type for operating said knife and adjustable to vary the total time cycle of said knife, a control member, and a transmission between said control member and said adjusting member comprising an arm pivoted for angular movement about a stationary axis, a link jointed to said arm, a member movable at a constant rate from said control member, and a link between said arm and said member.

12. A speed change drive of the Reeves type having a pair of pulleys, an adjusting lever for changing the effective relative diameters of said pulleys, and means for moving said lever in opposite directions and comprising a control member, and a transmission between said control member and said lever including a linkage operable in a plane substantially parallel to the plane of movement of said lever for moving said lever at a variable rate with respect to said control member.

13. A speed change drive of the Reeves type having a pair of pulleys, an adjusting lever for changing the effective relative diameters of said pulleys, and adjusting means for moving said lever in opposite directions and comprising a control member, a transmission between said control member and said levers including a pair of links movable in a plane substantially parallel to the plane of movement of said lever for moving said lever in opposite directions at a variable rate with respect to said control member, and separate means for bodily adjusting the position of said links in said plane to vary the speed characteristics of said links with respect to that of said control member.

14. In a cut-off mechanism of the type having a knife for cutting a continuously advancing sheet into sections and which travels with said sheet at the instant of cutting, a speed change drive of the Reeves type for said knife having a speed ratio adjusting member by which the total time cycle of said knife is changed, the combination comprising a rotatable control member 47, and a transmission between said control member and said adjusting member comprising an arm pivoted for angular movement about a stationary axis, a link 56 jointed to said arm, a screw 68, a nut 60 on said screw, and a link between said arm and said nut.

15. In a cut-off mechanism of the type having a knife which cuts a continuously advancing sheet into sections and which travels with said sheet at the instant of cutting, and a speed change drive of the Reeves type for said knife having a speed ratio adjusting member by which the total time cycle of said knife is changed, the combination comprising a control member, and a transmission between said control member and said adjusting member comprising a stationary block adjustably mounted, an arm pivoted for angular movement to said block, a member movable along a straight line and adjustable with respect to said control member, and a link between said arm and said member.

16. In a machine for cutting a traveling web into sheets, a speed change drive of the Reeves type having a pair of pulleys, a lever for changing the effective relative diameters of said pulleys, means for moving said lever in opposite directions and including a slide supported by said lever and movable lengthwise thereof, an oscillatory member for indicating the length of sheet cut, and a direct connection between said lever and said indicating member.

17. In a machine for cutting a traveling web into sheets, a speed change drive of the Reeves type having a pair of pulleys, a lever for changing the effective relative diameters of said pulleys, means for moving said lever in opposite directions and including a slide supported by said lever and movable lengthwise thereof, an oscillatory member for indicating the length of sheet cut, and a direct connection between said lever and said indicating member, and including a link and means for adjusting the length thereof to compensate for variations in the position of slide along said lever.

18. In a cut-off mechanism of the type having a knife for cutting a continuously advancing sheet into sections, a speed change drive of the Reeves type having driving and driven pulleys and a belt on said driven pulley driving said knife means for changing the effective speed ratio of said drive to vary the time cycle of said knife, adjustable mechanism for varying the speed of said knife during its cycle, an adjusting control member, means driven from said control member for adjusting the variation in the speed of said knife during its cycle, means driven from said control member for moving said speed ratio adjusting member simultaneously with the adjustments in said speed variation, but at a variable rate with respect to the movement of said control member to thereby maintain the cutting speed of said knife constant and equal to that of the traveling material for all changes in the length of sections cut, means for adjusting said last-mentioned moving means to compensate for changes required by stretching of said belt and to thereby maintain the speed of said knife approximately equal to that of the traveling material, and means for adjusting said moving means upon increases in the length of the belt, to thereby maintain the cutting speed of said knife constant and equal to that of the traveling material irrespective of any increase in belt length.

19. A machine having means for cutting a traveling web into sheets, an infinite speed change drive for said cutting means and having a speed adjusting member, power driven means for operating said adjusting member, a member movable into sheet length indicating position, a member manually movable into sheet length preselecting position, control means for operating said power driven means in a direction to move said indicating member into predetermined position with respect to said preselecting member, means for automatically rendering said power driven means inoperative when said indicating member reaches said predetermined position, and means for automatically operating said power driven means in a direction to cause movement of said indicating member towards said predetermined position when said indicating member moves in either direction out of said predetermined position.

20. A machine having means for cutting a traveling web into sheets, an infinite speed change drive for said cutting means and having a speed adjusting member, a reversible motor for operating said adjusting member, a sheet length scale, a member movable over said scale and operated from said motor for indicating the length of sheet cut, a sheet length preselecting member manually movable over said scale, control means for operating said motor in a direction to move said indicating member towards registry with said preselecting member, means for automatically stopping said motor when said indicating member reaches a position in registry with said preselecting member, and means for automatically operating said motor in a direction to cause movement of said indicating member towards registry with said preselecting member when said indicating member moves in either direction out of registry with said preselecting member.

21. A machine having a knife for cutting a traveling web into sheets, an infinite speed change drive for said knife and having a speed adjusting member, a reversible motor for operating said adjusting member, a sheet length scale, a member movable over said scale and operated from said motor for indicating the length of sheet cut, a sheet length preselecting member manually movable over said scale, control means for operating said motor in a direction to move said indicating member towards registry with said preselecting member, and including a pair of manually operable electric switches on one of said members for causing rotation of said motor in opposite directions when said indicating member moves out of registry with said preselecting member.

22. In a machine for cutting a traveling web into sheets, a cutter, an infinite speed change drive for said cutter and having a speed adjusting member, a motor for operating said adjusting member, a sheet length scale, a member movable over said scale and operated from said motor for indicating the length of sheet cut, a sheet length preselecting member manually movable over said scale, control means for operating said motor in a direction to move said indicating member towards registry with said preselecting member, means for automatically stopping said motor when said indicating member reaches a position in registry with said preselecting member, and a pair of electric switches causing rotation of said motor in opposite directions when said indicating member moves out of registry with preselecting members to thereby automatically restore it to registering positions.

23. In a machine for cutting a traveling web into sheets, a cutter, an infinite speed change drive for said cutter and having a speed adjusting member, a motor for operating said adjusting member, a sheet length scale, a member movable over said scale and operated from said motor for indicating the length of sheet cut, a sheet length preselecting member manually movable over said scale, control means for operating said motor in a direction to move said indicating member towards registry with said preselecting member, and including a pair of manually operable electric switches causing rotation of said motor in either direction when actuated from normal positions and automatically restored to normal positions when manually released, means for continuing the rotation of said motor after said switches have been released, means for automatically stopping said motor when said indicating member reaches a position in registry with said preselecting member, a pair of jog electric switches for operating said motor in either direction, and means operable when said jog switches are rendered inoperative for converting said first-mentioned switches into jog switches, whereby said motor is made to operate only as long as said first-mentioned switches are actuated.

HERBERT C. BEHRENS.